United States Patent [19]
Overton et al.

[11] Patent Number: 6,110,379
[45] Date of Patent: *Aug. 29, 2000

[54] METHOD FOR TREATING WATER CONTAINING SULFATE

[76] Inventors: James Michael Overton, 1127 Nickel La., Yuba City, Calif. 95991; Stephen Ray Wurzburger, P.O. Box C, Goodyear's Bar, Calif. 95944

[ * ] Notice: This patent is subject to a terminal disclaimer.

[21] Appl. No.: 08/984,564

[22] Filed: Dec. 3, 1997

Related U.S. Application Data

[63] Continuation-in-part of application No. 08/613,606, Mar. 11, 1996, Pat. No. 5,698,107.
[51] Int. Cl.[7] .................................................. C02F 1/461
[52] U.S. Cl. ..................... 210/695; 210/199; 210/652; 210/716; 210/724; 210/726; 210/748; 210/912; 205/742; 205/771
[58] Field of Search ..................... 210/199, 652, 210/695, 702, 709, 716, 717, 723, 724, 726, 738, 748, 912; 205/742, 771

[56] References Cited

U.S. PATENT DOCUMENTS

| | | | |
|---|---|---|---|
| 3,511,777 | 5/1970 | Spinola | 210/49 |
| 4,695,378 | 9/1987 | Ackman | 210/198.1 |
| 5,116,507 | 5/1992 | Ebbins et al. | 210/652 |
| 5,427,691 | 6/1995 | Kuyucak et al. | 210/724 |
| 5,443,719 | 8/1995 | Johnson et al. | 210/101 |

*Primary Examiner*—Jay H. Woo
*Assistant Examiner*—Betsey J. Morrison

[57] ABSTRACT

An apparatus and method for removing contaminating metal ions and sulfate ions from acidic aqueous solution such as waste mine water which features passing the solution between pairs of electrodes, each pair of electrodes impressed with a voltage selected according to specific ion species and then adding chemical agents to raise the pH and form precipitates of the metal and sulfate ions. A magnetic field is applied during at least the first mixing step. The precipitate is then separated from the water with settling and filtering steps. The clarified solution is treated by reverse osmosis to concentrate the ammonium.

15 Claims, 1 Drawing Sheet

1. MODIFY ION STATE

2. ADD FIRST AGENT IN MAGNETIC FIELD

3. DIGEST SOLUTION

4. SEPARATE LIQUIDS FROM SOLIDS

5. ADD SECOND AGENT, REMOVE SULFATES

6. PASS THRU REVERSE OSMOSIS

7. ADJUST pH

1. MODIFY ION STATE
2. ADD FIRST AGENT IN MAGNETIC FIELD
3. DIGEST SOLUTION
4. SEPARATE LIQUIDS FROM SOLIDS
5. ADD SECOND AGENT, REMOVE SULFATES
6. PASS THRU REVERSE OSMOSIS
7. ADJUST pH

1. ADD $H_2SO_4$
2. ADD $CA(OH)_2$
3. FILTER
4. ADD KOH
5. ADD MgO

METHOD FOR TREATING WATER CONTAINING SULFATE

CROSS REFERENCE TO EARLIER FILED APPLICATIONS

This application is a continuation-in-part of application Ser. No. 08/613,606 filed Mar. 11, 1996, now U.S. Pat. No. 5,689,107, issued Dec. 16, 1997 for which priority is claimed.

FIELD OF THE INVENTION

This invention relates to the conversion of de-metallized sulfate water into ammonia sulfate and aqua ammonia.

BACKGROUND AND INFORMATION DISCLOSURE

Acid mine drainage (AMD) results from oxidation of metal sulfide minerals, primarily pyrites and other sulfide ores. The acidic reaction products are absorbed by the descending waters and rising subsurface waters which enter the surface water ecosystems. Some large mine sites currently generate an excess of six million gallons AMD per day. One particular mine site, located in Northern California, generates 25% of the total metal contamination entering the ground water of the entire United States.

U.S. Pat. No. 4,695,378 discloses treatment of AMD according to the following steps:
(1) neutralization
(2) aeration
(3) settling and disposal of sludge
(4) effluent discharge Neutralization, aeration, and settling equipments are expensive and require large structures and excavation for large treatment facilities.

U.S. Pat. No. 3,511,777 discloses raising the pH from the acid range to the basic range by mixing with lime. The cation constituents combine with the calcium carbonate to generate bicarbonates. The sulfate ion $SO_4^{--}$ ion remains in large concentrations in the treated water.

Another widely practiced method used for removing metals from acid water is a pH control method in which CaOH is added to the waste stream to raise the pH. With single valency metal contaminants, most of the metal can be removed by raising the pH of an initially highly acidic solution to 8.5. With high valency ions, the pH must be raised to above 10.5. The sludge generated in some of these cases has required the use of separators in place of the more economical filters.

The major problem encountered with hydroxide precipitation processes with multiple metal contaminants is the wide range of solubilities of the formed hydroxide precipitates. In order to precipitate most of the metal, the pH must be raised to the range 10.5 to 11.0. When the basic solution is neutralized, some of the metal goes back into solution and recontaminates the water.

In acid industrial waste water, the heavy metal ions are usually singly charge. (A notable exception is the effluents from electroplating processes.) Natural contaminated water typically contains several ionic states of the same metal. Each ionic state, when combined with a neutralizing compound containing OH, form as metal hydroxides of varying stoichiometries. Some of these hydroxides are insoluble precipitates. Most of the generated hydroxides are characterized by a strongly pH dependent solubility. These soluble hydroxides in some cases can be partially removed by physical absorption or crystal chemical inclusion (chemisorption) and may be lowered to acceptable levels.

The use of sodium, potassium and calcium hydroxides creates a metal bearing sludge that is very difficult to filter effectively and the metal hydroxide cake is hopelessly cross contaminated so as to be beyond economical separation and are classified as hazardous waste with all the problems and expense of hazardous waste disposal. Treatments of waste water containing large concentrations of sulfate ions produce water having a large concentration of $SO_4^{--}$ even though the pH is in an otherwise acceptable range.

The Iron Mountain Mine Site located near Redding, Ca. and the Berkeley Pit located at Butte Mont. are particularly notorious examples of the undesirable environmental impact of AMD. At the Iron Mountain Site, there are fifteen or more highly toxic contaminants present, some in large quantities. The AMD waste water from the Iron Mountain waste water in California has a pH between 0.58 to 0.75.

Table I lists the average concentration over a twelve month period in the Iron Mountain Mine Site.

TABLE I

Aluminum 2300 ppm
Arsenic 33.5 ppm
Barium <10.0 ppm
Beryllium <0.5 ppm
Cadmium 10.7 ppm
Chrome <0.1 ppm
Copper 350 ppm
Iron 13.1 ppm
Lead 3.5 ppm
Magnesium 605 ppm
Nickel <4 ppm
Thallium <0.2 ppm
Vanadium <0.2 ppm
Zinc 1,595 ppm
$SO_4$ 55,200 mg/liter
Total dissolved solids 81,565 ppm mg/liter.

TABLE II lists the impurity content of a sample taken from the surface level of the Berkeley Pit.

TABLE II

Ca 463 ppm
Mg 452 ppm
Pb 0.048 ppm
$SiO_3$ 103.0 ppm
Fe 373 ppm
Mn 233 ppm
Al 79.9 ppm
Ag <79.9 ppm
B <0.10 ppm
Cd 2300 ppm
Cu 189 ppm
Li 0.272 ppm
Mo <0.040 ppm
Ni 1250 ppm
Sr 1700 ppm
As 0.103 ppm
Co 1440 ppm
Cr 0.041 ppm
$SO_4$ > 6930 mg/liter

OBJECT OF THE INVENTION

It is an object of this invention to provide an improved process for treating AMD having high sulfate levels.

It is another object to completely remove anion as well as cation constituents which has the advantage over the prior art wherein anion components are retained in soluble form.

It is another object to provide a process for treating waste water which avoids the production of large amounts of calcium sulfate which in some processes can be as great as 1.5 lb.s dry weight of calcium sulfate per gallon treated.

SUMMARY

This invention is directed toward a process for treating AMD which contains a large quantity of sulfates. The drainage is first subjected to an electric field after which the pH is raised to at least 8.0 and mixed in a magnetic field. The mixture is then allowed to digest allowing a sludge to form. The liquid portion is separated from the sludge. A second agent (preferably ammonium hydroxide) is added to the clarified liquid forming insoluble sulfate which is removed by filtering. The remaining liquid is subject to reverse osmosis to concentrate the ammonia as aqua-ammonia.

DESCRIPTION OF PREFERRED EMBODIMENTS

Figures 1, 2, 3:
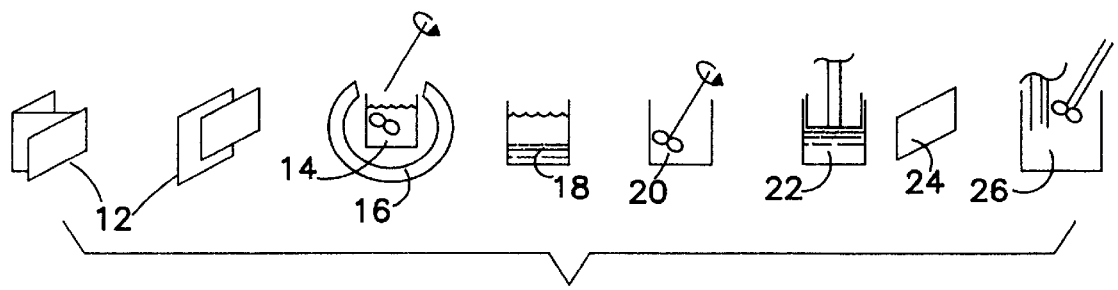
FIG. 1 is a flow chart showing the method of this invention.
FIG. 2 is a schematic diagram of the apparatus for performing the process of FIG. 1.
FIG. 3 is a list of steps for preparing the first chemical agent.

Turning now to a discussion of the drawings, FIG. 1 lists the steps in practicing the method of the invention. FIG. 2 shows the apparatus for carrying out the process of FIG. 1.

As illustrated by FIGS. 1 and 2:

Step 1: A.M. D. is passed serially through a number of "ion state modification" chambers. Each chamber has a pair of electrodes 12, preferably carbon, across which an electric field is applied. The voltage between the electrodes in each chamber is selected to optimize the "conditioning" of a particular class of ionic species, (e.g., single valence, double valence, triple valence).

Step 2: A first chemical agent is added to A. M. D. and mixed in container 14 in the presence of a magnetic field imposed by magnets 16 in a sufficient amount to raise the pH to about 7.5. A preferred first chemical agent is prepared according to steps listed in below and illustrated in FIG. 3

Step 3: The mixture is agitated in a digesting tank for about thirty minutes where a slurry of precipitates is formed and the pH increases to at least 8.5.

Step 4: The A.M.D. enters a separator 18 which may be a settling tank or filter press where precipitate is separated as sludge from clarified liquid fraction and the sludge is further dewatered by passage through a filter press. At this point in the process, the original contaminating metal ions have been removed from the A.M.D. and the A. M.D. is said to be "demetalized".

Step 5: The clarified demetalized AMD is then mixed in mixer 20 with a second agent in sufficient amount to precipitate insoluble sulfates. A preferred second agent is ammonium hydroxide which forms insoluble ammonium sulfate. The precipitated sulfates are separated from the clarified liquid such as by filtering and dewatering in a filter press 22.

Step 6: The clarified ammonia water is run through a reverse osmosis membrane 24 to concentrate the ammonium as an aqua-ammonia solution.

Step 7: The aqua-ammonia solution may be pH adjusted as illustrated at station 26 and the solution discharged.

A preferred first agent for raising the pH in step 2 is illustrated by the flow chart of FIG. 2 according to which:

Step 1: concentrated sulfuric acid is added to water in an amount equal 40 ml of sulfuric acid to one liter of water;

Step 2: $Ca(OH)_2$ is added to bring the concentration of the pH of said first addition solution to a pH in a range between 12.8 to 13.1;

Step 3: addition solution is added through an eleven micron filter whereby any particulates of $CaSO_4$ larger than eleven microns are removed;

Step 4: potassium hydroxide is added to increase pH of said first addition solution to a range between 13.8 to 14 whereby a base solution is produced;

Step 5: magnesia is added in an amount of 10 grams per one liter of base solution whereby said first chemical agent is provided.

FIG. 3 shows a mechanical schematic diagram of the apparatus 10 for practicing the invention.

There are shown:

the AMD passing between electrodes 12 which are preferably carbon;

the mixing container 14 with magnet 16 for adding the first agent;

the settling container 18;

the mixer 20 for addition for the second agent;

the press 22;

the reverse osmosis apparatus 24;

the apparatus for adjusting pH 26.

The process of this invention avoids the production of large quantities of anhydrous calcium sulfate and water having a high pH that is associated with other processes. The high pH has to be adjusted downward so as to satisfy discharge requirements. Production of calcium sulfate can be as high as 1.5 pounds (dry weight) per gallon of water treated. While anhydrous calcium sulfate is not a hazardous material and has some agricultural uses, the cost of drying and handling the large amounts of this material generated and a large AMD site costs considerably more than economic values derived from its sale.

What is claimed is:

1. A method for removing contaminating metal ions from an aqueous solution which is initially acidic and which includes the steps performed in operable order:

I. selecting at least one pair of electrodes and passing the aqueous solution between said at least one pair of electrodes, a voltage applied between each pair selected to condition at least one of said ions respectively to form first precipitate when a pH of said aqueous solution is subsequently raised to a value where said first precipitate is formed;

II. providing a first chemical agent selected to raise a pH of said solution to said value;

III. agitating said aqueous solution while adding said first chemical agent in sufficient amount to raise a pH of said solution to said value whereby a slurry of first precipitate of said conditioned metal ions forms;

IV. providing a first means for separating said first precipitate from clarified liquid of said aqueous solution and discharging said aqueous solution into said first means for separating, permitting removal of said contaminating metal ions from said aqueous solution and leaving a clarified aqueous liquid fraction.

2. The method of claim 1 wherein said value of pH where said first precipitate is formed is 8.5 and step II includes the step in operable order:

providing said first chemical agent selected to raise said pH to a value of 8.5; and step III includes the step in operable order:

adding to said solution said first chemical agent and agitating said solution until a pH of said aqueous solution increases to a value of about 8.5 whereby a slurry of first precipitate is formed.

3. The method of claim 2 wherein said aqueous solution contains sulfate ions and said method further comprises:

V. mixing said liquid fraction with a second chemical agent, said second chemical agent selected to precipitate said sulfate ions as insoluble sulfates;

VI. selecting another means for separating said insoluble sulfates from said liquid fraction and passing said liquid fraction containing said insoluble sulfates through said second means for separating whereby doubly filtered liquid fraction is produced.

4. The method of claim 2 wherein providing said first chemical agent includes the steps of:

(i) adding concentrated sulfuric acid to water in an amount equal 40 ml of sulfuric acid to one liter of water;

(ii) adding $Ca(OH)_2$ to bring the concentration the pH of said first addition solution to a pH in a range between 12.8 to 13.1;

(iii) passing said addition solution through an eleven micron filter whereby any particulates of $CaSO_4$ larger than eleven microns are removed;

(iii) adding potassium hydroxide to increase pH of said first addition solution to a range between 13.8 to 14 whereby a base solution is produced;

(iv) adding magnesia in an amount of 10 grams per one liter of base solution whereby said first chemical agent is provided.

5. The method of claim 2 wherein said step of adding said first chemical agent includes the step of mixing said first chemical agent into said aqueous solution in the presence of a magnetic field.

6. The method of claim 3 wherein said step V includes the step of selecting said second addition solution to be ammonium hydroxide.

7. The method of claim 1, wherein step IV comprises selecting said first means for separating to be one of:

(i) a settling tank;
(ii) a filter press.

8. The method of claim 3 wherein said step of selecting a second means of separating includes the step of selecting at least one of:

(i) a settling tank;
(ii) a filter press.

9. The method of claim 6 which includes after step VI the step:

VII. passing said doubly filtered liquid through a reverse osmosis membrane whereby aqua ammonia solution is produced.

10. The method of claim 9 which includes the step after step VII:

VIII. Adjusting pH of said aqua ammonia solution to a value in a range between 6.5 to 8.0 whereby a discharge solution is produced having acceptable discharge specifications.

11. The method of claim 9 which includes the step of selecting at least one pair of electrodes of said at least one pair of electrodes to be carbon.

12. The step of claim 1 wherein said step I includes the steps:

applying a first voltage selected from a range of 9.0 to 12.0 volts to a first pair of said at least one pair of electrodes;

applying a second voltage selected from a range of 22 to 24 volts to a second pair of said at least one pair of electrodes;

applying a third voltage selected from a range of 50 to 55 volts to a third pair of said at least one pair of electrodes.

13. The apparatus of claim 1 wherein said means for applying voltage comprises:

means for applying a first voltage selected from a range of 9.0 to 12.0 volts to a first pair of said at least one pair of electrodes;

means for applying a second voltage selected from a range of 22 to 24 volts to a second pair of said at least one pair of electrodes;

means for applying a third voltage selected from a range of 50 to 55 volts to a third pair of said at least one pair of electrodes.

14. An apparatus for removing contaminating metal ions from an aqueous solution which is initially acidic which comprises:

at least one pair of electrodes arranged to permit passing the aqueous solution between said at least one pair of electrodes;

means for applying a respective voltage applied between each pair of electrodes wherein said respective voltage applied to each said pair of electrodes is selected to condition at least one of said ions to form a first precipitate when a pH of said aqueous solution is subsequently raised to a value where said first precipitate is formed;

means for providing a first chemical agent selected to raise a pH of said solution to said value;

means for agitating said aqueous solution while adding said first chemical agent in sufficient amount to raise a pH of said solution to said value whereby a slurry of first precipitate of said conditioned metal ions forms;

means for applying a magnetic field while mixing said first chemical agent into said aqueous solution:

first means for separating said first precipitate from clarified liquid of said aqueous solution;

means for adding ammonium hydroxide to said clarified liquid whereby a solution containing ammonia and precipitate of ammonium sulfate is formed;

means for filtering said ammonium sulfate from said solution containing ammonia and precipitate of ammonium sulfate;

a reverse osmosis membrane means for passing said doubly filtered liquid through a reverse osmosis membrane whereby aqua ammonia solution is produced;

means for adjusting pH of said aqua ammonia solution to a value in a range between 6.5 to 8.0 whereby a discharge solution is produced having acceptable discharge specifications.

15. The apparatus of claim 14 wherein at least one pair of electrodes of said at least one pair of electrodes is carbon.

* * * * *